(12) United States Patent
Flemisch et al.

(10) Patent No.: US 7,991,491 B2
(45) Date of Patent: Aug. 2, 2011

(54) CONTROL DEVICE AND METHOD FOR GENERATING CONTROL SIGNALS FOR TECHNICAL DEVICES

(75) Inventors: Frank Flemisch, Braunschweig (DE); Jan Schomerus, Braunschweig (DE); Johann Kelsch, Braunschweig (DE)

(73) Assignee: Deutsches Zentrum für Luft- und Raumfahrt e.V., Cologne (DE)

( * ) Notice: Subject to any disclaimer, the term of this patent is extended or adjusted under 35 U.S.C. 154(b) by 1206 days.

(21) Appl. No.: 11/559,420

(22) Filed: Nov. 14, 2006

(65) Prior Publication Data

US 2007/0129815 A1    Jun. 7, 2007

(30) Foreign Application Priority Data

Nov. 18, 2005   (DE) .......................... 10 2005 055 584

(51) Int. Cl.
*G05B 11/01* (2006.01)
(52) U.S. Cl. ................ 700/83; 700/11; 700/70; 701/11; 701/23; 701/41; 701/52; 701/60; 701/68
(58) Field of Classification Search ................ 700/11, 700/83, 70; 701/11, 60, 68, 52, 23, 41
See application file for complete search history.

(56) References Cited

U.S. PATENT DOCUMENTS

| | | | | |
|---|---|---|---|---|
| 4,563,743 | A * | 1/1986 | Murphy et al. | 701/4 |
| 5,331,558 | A * | 7/1994 | Hossfield et al. | 701/21 |
| 6,067,782 | A * | 5/2000 | Diekhans | 56/10.2 A |
| 6,460,810 | B2 * | 10/2002 | James | 244/194 |
| 6,675,076 | B1 * | 1/2004 | Moody | 701/11 |
| 7,243,014 | B2 * | 7/2007 | Takamatsu et al. | 701/48 |
| 7,676,303 | B2 * | 3/2010 | Hanel | 701/3 |
| RE41,358 | E * | 5/2010 | Heiniger et al. | 701/23 |
| 2002/0198632 | A1 * | 12/2002 | Breed et al. | 701/1 |
| 2004/0215372 | A1 * | 10/2004 | Bateman et al. | 701/1 |
| 2005/0209762 | A1 * | 9/2005 | Lu et al. | 701/70 |
| 2006/0074538 | A1 * | 4/2006 | Bauer et al. | 701/48 |
| 2006/0235590 | A1 * | 10/2006 | Bolourchi et al. | 701/41 |
| 2007/0050101 | A1 * | 3/2007 | Sacle et al. | 701/11 |

FOREIGN PATENT DOCUMENTS

EP    0 743 581 B1    12/1999

OTHER PUBLICATIONS

Wlodzislaw et al, "Computational Intelligence Methods for Rule-Based Understanding", May 2004, Proceedings of the IEEE, vol. 92, No. 5, pp. 771-805.* Bellino et al, "Lane Detection Algorithm for an onboard camera", 2005, Proceedings of SPIE vol. 5663, pp. 102-111.*
Won, "A Joystick Drving Control Algorithm with a Longitudinal Collision Avoidance Scheme for an elctrical vehicle", 2003, KSME international journal vol. 17, pp. 1399-1410.*
Frank Flemisch et al. The H-Metaphor as a Guidelines for Vehicle Automation and Interaction, NASA/TM-2003-122672, Langley Research Center, Hampton, Virginia, Dec. 2003, pp. 1-30.
Frank Flemisch et al., At the Crossroads of Manually Controlled and Automated Transport: The H-Metaphor and its First Applications (Progress update 2005), ITS-1-3.6.2005, Hannover, Germany.

* cited by examiner

*Primary Examiner* — Albert Decady
*Assistant Examiner* — Olvin Lopez
(74) *Attorney, Agent, or Firm* — Whitham Curtis Christofferson & Cook, PC

(57) ABSTRACT

A control device for controlling a controlled system, such as steering, braking or accelerating when driving a car, as well other operations for other vehicles or systems, includes an automatic control system that generates automatically generated control signals, a haptic control command input device generates manual control command inputs, and an arbitration unit which resolves disputes between the automatically generated signals and the manual control command inputs. The haptic control generates control signals that depend on both the automatically generated control signals and the manual control command inputs, and adjustments are made continuously therebetween using rule based feed back control signals. Arbitration is performed in the dead spaced of the controlled system or the haptic control command input device.

27 Claims, 2 Drawing Sheets

CONTROL DEVICE AND METHOD FOR GENERATING CONTROL SIGNALS FOR TECHNICAL DEVICES

Figure 1:
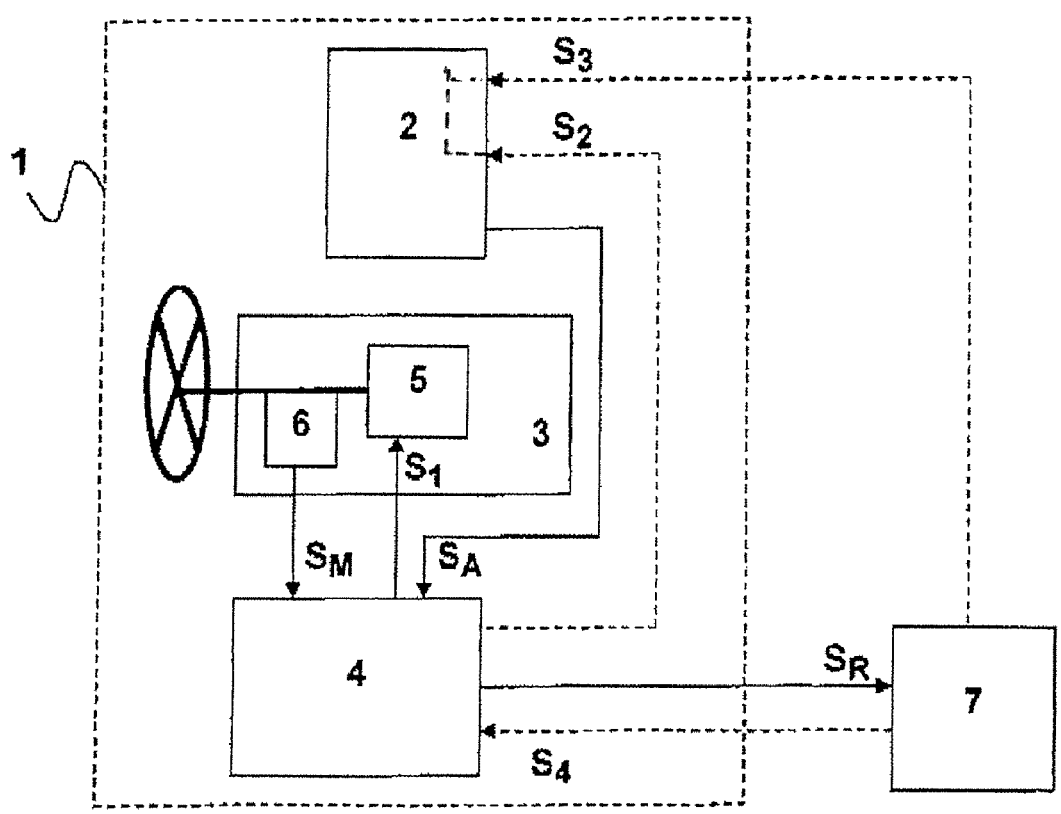

The present invention relates to a control device using haptic arbitration, comprising:
- an automatic control command system for the automatic generation of control signals,
- a haptic control command input device which has at least one actuator for operating the control command input device in dependence on the automatically generated control signals and at least one sensor for detecting manual control command inputs by manual operation of the control command input device, and
- an arbitration unit for generating control signals which are conducted to a controlled system following the arbitration unit, in dependence on the automatically generated control signals and the manual control command inputs.

The invention also relates to a method for generating control signals for technical devices which have at least one controlled system with dead space and such a control device.

Technical devices are increasingly controlled automatically. For reasons of safety and acceptance, however, manual control is also often required and wanted. Thus, for example in aircraft, fully automatic control by means of an autopilot is selected in certain flight phases. In the case of manual intervention, however, manual control is prioritized. A corresponding arrangement is known from motor vehicles which are equipped with an automatic speed control.

Due to technical advances, automation is becoming evermore complex and efficient, for example in motor vehicles or aircraft. Automatic control devices are increasingly becoming capable of performing actions which do not correspond to the intentions or actions of an operator. This is desirable in some cases when, for example, the operator performs hazardous actions due to fatigue, and sometimes undesirable when, for example, the automation has inadequate information at its disposal. Conventional methods of interaction with such automatic control systems are based on entering numerical values in the rotary input element, on pressing buttons or programming the automation behind them. Overriding of the automation by the human operator is mainly achieved by switching off the automation. The operator is influenced by the automation mainly by means of warnings which, in turn, are acted on by the operator via the actuators, or by limiting the control inputs at a lower technical layer. In individual cases, a haptic feedback of the automation is already used, for example in vehicle control, for example via entering forces or moments into a control command input device without, however, the automation having any idea about how this feedback is received by the operator.

Understanding and operating such complex automation is becoming more and more difficult for the user. In the aircraft field, for example, a so-called out-of-the-loop problem can occur in which the operator is no longer sufficiently involved due to the lack of feedback. Frequently, the different controllers and operating knobs can no longer be taken in mentally by the user ("One-box-at-a-time" automation). As well, the user can become confused with regard to the valid control mode ("mode confusion") in which different operating states and the intended action of the automation are not detected or wrongly detected. Such conventional control devices with combined automatic and manual control command input are susceptible to accidents since operator and automation are possibly working against one another without conflict of action being adequately resolved.

In F. Flemisch, C. Adams, S. Conway, K. Goodrich, M. Palmer, P. Schutte: "The H-metaphor as a Guideline for Vehicle Automation and Interaction", NASA/TM-2003-212672, December 2003, a control concept based on the so-called horse metaphor is described. The control concept is based on an intelligent automatic control system equipped with sensors which can be influenced with the aid of haptic control command input devices by means of manual control command input by a person. Similar to the guidance of a horse moving independently, the automatically generated and manual control profiles balance one another with the aid of force and counterforce of a haptic control command input device. In the case of "loose reins", i.e. little influence by means of manual control command inputs, the automatic control command system takes over control, whereas in the case of "tight reins", i.e. in the case of strong influence by means of manual control command inputs, the operator essentially takes over control.

In F. Flemisch, K. Goodrich, S. Conway: "At the crossroads of manually controlled and automated transport: The H-metaphor and its first applications", in Fifth European Congress exhibition on intelligent transport systems and services (ITS); Hanover 1-3 Jun. 2005, an aircraft and vehicle control device based on the H-metaphor, comprising a haptic control command input device and an automatic control command system for automatically generating control signals is described. A vehicle is controlled by means of a haptic control command input device onto which a force characterizing the control command input and noticeable to the user is introduced with the aid of at least one actuator and automatically generated control signals. The user can counteract this force or follow it. To balance the manual and automatic control commands, there can be prioritization between the intention of the user and the automatic control command system.

DE 20 2004 050 584 A1 discloses a vehicle parking aid system, in which an additional steering force is applied to a steering wheel by use of a control module resulting in support of the driver of the vehicle in the parking process. The applied steering force is chosen such that the vehicle guidance is simulated for the driver, which can be stopped immediately by steering in the opposite direction.

DE 10 2004 026067 A1 discloses a vehicle steering system in which the clutch mechanism is provided in the steering column. By respective control of the clutch mechanism, the steering system can work selectively in "steer-by-wire mode", a servo steering mode or a manual mode.

Further, EP 0 743 581 B1 discloses a system for resetting a pilot steering while automatic guidance by use of an auto-pilot. Actions of the auto-pilot resulting in control of the respective airplane control means are fed to the flight control input devices for the pilot so that the pilot is able to recognize which action the auto-pilot actually performs.

It is the object of the present invention to create an improved control device of the type initially mentioned.

According to the invention, the object is achieved by means of a control device of the type initially mentioned in that the arbitration unit is set up in order, in the case of mutually contradictory or overriding (i.e. excessively complementary) manual control command inputs and automatically generated control signals, to continuously adjust to one another, within an arbitration phase selected in dependence on the dead space of the haptic control command input device and/or the controlled system, the manual control command inputs and the automatically generated control signals, by rule-based generation of a correction signal and feeding back the correction signal to at least one actuator of the haptic control command input device.

The dead space comprises dead times, spatial dead zones and/or areas of low transmission (or increased attenuation) in the frequency domain. In the dead spaces, inputs at the haptic control command input device do not or only conditionally effect a change in the behaviour of the controlled system.

Due to the (continuous) input of the desired actions of the automatic control command system into the haptic control command input device and detection of the response of the user, i.e. of the manual control command inputs to the actions desired by the automatic control command system and correction of the automatically generated control signals in dependence on the detected response, a controlled-system control signal is generated which produces an action which is common and meaningful for the automatic system and the user. For this balancing of the automatically generated control commands and manual control command inputs, the dead spaces in most cases existing in the controlled system following and/or built into the control command input device are used as an arbitration phase in order to provide for inputs to the arbitration unit without the controlled system already responding. Taking into consideration the dead space thus prevents the controlled system from responding to the contradictory control commands of the operator and of the automatic system. In this arrangement, it is particularly advantageous to take into consideration the combination of dead time and dead zone.

Whereas the dead space has previously been considered as an unavoidable characteristic of a controlled system which is to be minimized, it is now advantageously utilized as arbitration space within which the controlled-system control signals conducted to the controlled system are generated from the manual and automatic control command input into the control command input device. The balancing between automatic and manual control takes place and is preferably concluded within the arbitration phase.

For example, the arbitration phase can be started when the difference between manual control command input and automatically generated control signal exceeds a defined threshold.

The correction signal of the arbitration unit to at least one of the actuators of the haptic control command input device can be fed back directly by application to the actuator in dependence on the correction signal and/or indirectly by feeding the correction signal back to the automatic control command system. The correction signal can be used as a correcting variable to a control signal generated by the automatic control command system, applying a drive signal correlated with the corrected signal to the actuators. However, it is also conceivable that the haptic control command input device has a first group of actuators which are exclusively activated by means of the automatically generated control signals of the automatic control system, and has a second group of actuators which are exclusively activated by means of the correction signals of the arbitration unit and may mechanically counteract the first group.

It is particularly advantageous if the control device is set up for a variable adjustment of the dead space of the controlled system. The control device can be parameterized by reducing or preferably increasing the dead time so that, as a result, it reacts more or less rapidly or temperamentally to control inputs.

The arbitration unit is preferably set up for evaluating the safety and urgency of the intended actions in each case predetermined by the automatically generated control signals and manual control command inputs and for prioritizing the control command input which produces a safer or more urgent control action. This solves conflicts between manual and automatic control and ensures that the control command preassessed as safer and more urgent is given priority. Arbitration can be effected with the aid of decision matrices in which predetermined control commands (decisions) are registered in dependence on states of the automatic and manual control.

For the purpose of prioritization, the automatically generated control signals are amplified, i.e. for example overweighted, when the control actions to be effected by the automatically generated control signals are preassessed as safer and/or more urgent than the control actions to be effected by the manual control command inputs. On the other hand, the automatically generated control signals can be reduced when the control actions to be effected by the manual control command inputs are preassessed as safer and/or more urgent than the control actions to be effected by the automatically generated control command inputs.

To balance the automatic and manual control commands in the case of a conflict, it is also advantageous if, for the purpose of prioritization, the automatically generated control signals are reduced when both the control actions to be effected by the automatically generated control signals and the control actions to be effected by the manual control command inputs are preassessed as safe and/or urgent. That is, the manual control action is accorded priority in this case when both the automatic control action and the manual control action are preassessed as safe and/or urgent.

It is also advantageous if the control device has a discrete change-over switch connected to the arbitration unit or a continuous switching element (for example a potentiometer) for prioritizing the manual control command input or automatically generated control signals. Prioritization can take place, for example, due to different weighting of the manual and automatic control commands.

A secondary arbitration phase, following the arbitration phase, still provides the yielding entity, person or automation, with the possibility of producing a change of the control signal generated in the arbitration phase by means of manual intervention or indirectly by means of additional visual, acoustic or haptic communication. The communication can also be supplemented by voice input/output, noise input/output or visual display. Furthermore, a coupling to states of the operator can be effected which are detected by recognizing the direction of looking or of the head or movement of eyelids. These states are then conducted to the arbitration unit.

The control device can have, for example, at least one optical, acoustic and/or haptic signal unit, coupled to the arbitration unit, for outputting a communication signal dependent on the correction of the automatically generated control signals. The automatic control command system can thus draw attention to the fact that it is proposing a different control action than has been adjusted in the arbitration phase or secondary arbitration phase, for example by means of acoustic or visual outputs. The control device 1 has at least one input unit, coupled to the arbitration unit 4 for the optical, acoustic or haptic input of communication signals or states for correction of the control-system control signal $S_R$.

The control device is preferably set up for detecting discrete command inputs from manual control command inputs within an arbitration phase and generating additional control signals which are not forwarded to the controlled system following. This makes it possible also to have a discrete command input, in addition to the continuous control, without this affecting the controlled system. It is thus possible, for example, to issue switching instructions by short abrupt movements on a joystick or steering wheel without these abrupt movements having an effect on the steering characteristic. These discrete control command inputs are again possible by utilizing the dead space for the arbitration phase.

An advantageous embodiment correspondingly provides that the automatic control command system, by activating the haptic control command input device, conveys discrete commands to the user which, e.g. due to the dead space or due to filtering-out, are not forwarded to the controlled system, or only in a limited way.

To detect the discrete control commands, the control device preferably has a plurality of state machines or pattern recognizers, these state machines or pattern recognizers being activatable in dependence on detected signal patterns from manual control command inputs and coupled to one another for mutual activation for outputting defined control signals. The discrete control commands are detected in agreement with the arbitration unit in order to distinguish manual control command inputs from automatically generated control signals and, if necessary, to remove the discrete control commands from the arbitration. The state machines or pattern recognizers thus make it possible to detect and to convert and to filter out discrete control inputs in real time so that the discrete control inputs do not have any effect on the continuous control signals applied to the controlled system.

It is particularly advantageous if the automatic control command system is set up for generating neutral control signals not acting on the controlled system and the arbitration unit is set up for detecting the response by manual control command inputs to these neutral control signals and generating controlled-system control signals for the subsequent controlled system in dependence on the detected response. The neutral control signals can be signals which are limited in a defined manner in time, are amplitude limited, pulse-shaped or frequency-limited in a defined manner, which, due to their characteristic, can be filtered out in the arbitration unit so that they are not conducted to the controlled system. In this manner, the automatic control command system does not continuously provide a control signal for the controlled system which is only adjusted by means of a manual control signal which is not necessarily present. Instead, the neutral control signals are only used for indicating the control action proposed by the automatic control command system to the user via the control command input device. To influence the controlled system, i.e. to control a technical device, the response of the user to the proposals signalled is then of significance.

It is also the object of the present invention to create an improved method for generating control signals for technical devices of the type initially mentioned.

According to the invention, the object is achieved by means of the generic method, having the following steps:
  automatic generation of control signals and actuatory operation of a control command input device in dependence on the automatically generated control signals,
  detection of manual control command inputs via the control command input device in response to the actuatory operation of the control command input device by the automatically generated control signals,
  generation of controlled-system control signals for the controlled system by the arbitration unit with, in the case of mutually contradictory or overriding manual control command inputs and automatically generated control signals,
    continuous adjustment of the manual control command inputs and of the automatically generated control signals to one another by rule-based generation of a correction signal, and
    feedback of the correction signal to at least one actuator of the haptic control command input device within an arbitration phase selected in dependence on the dead space of the haptic control command input device and/or of the controlled system.

Advantageous embodiments of the method are described in the subclaims in accordance with the described features of the control device.

Figure 2:
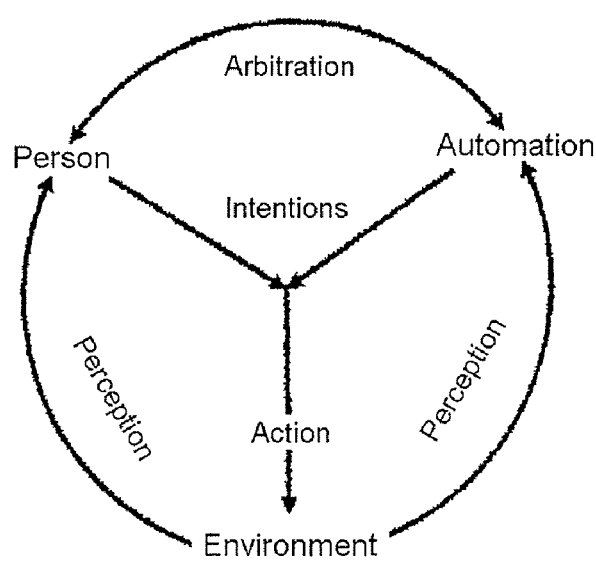
Figure 3:
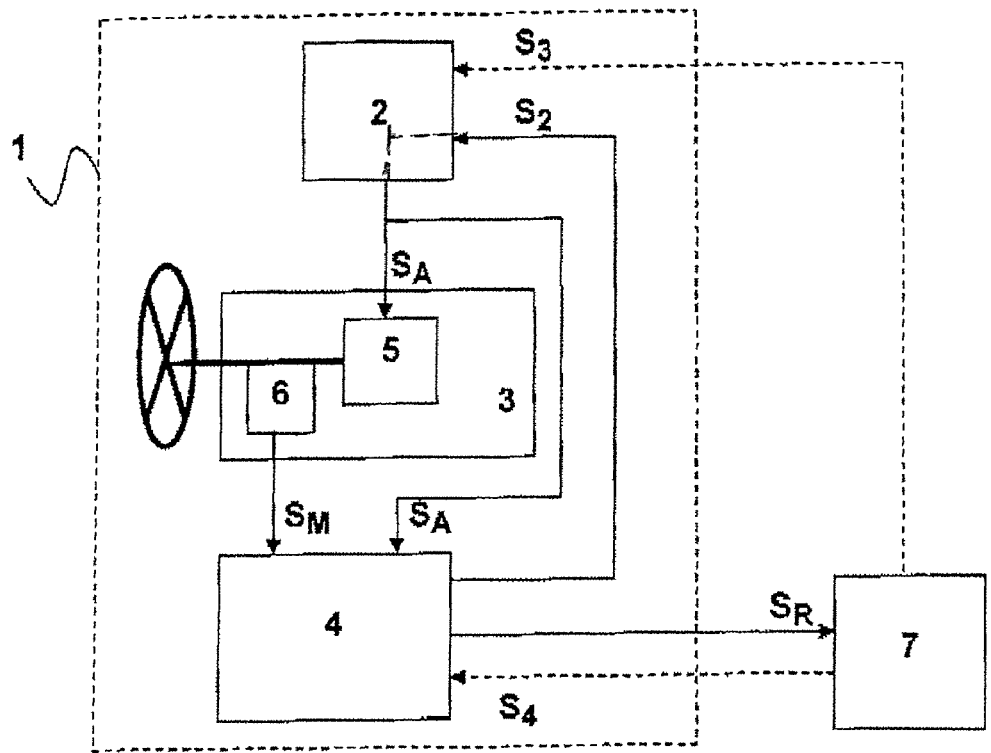
Figure 4:
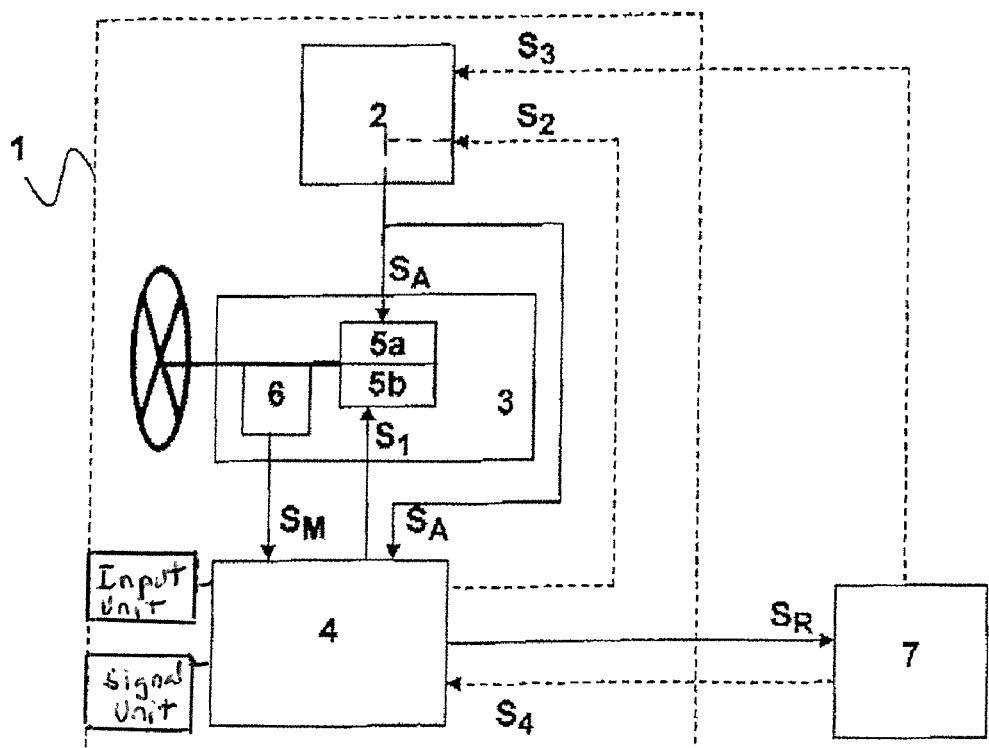

In the text which follows, the invention will be explained in greater detail by means of an illustrative embodiment with attached drawings, in which:

FIG. 1—shows a block diagram of a first embodiment of the control device;

FIG. 2—shows a representation of the relationship between person, automation and environment, with arbitration between person and automation;

FIG. 3—shows a block diagram of a second embodiment of the control device;

FIG. 4—shows a block diagram of a third embodiment of the control device.

FIG. 1 shows a diagram of a control device 1 which essentially has an automatic control command system 2, a haptic control command input device 3 and an arbitration unit 4. The automatic control command system 2 is provided for the automatic generation of control signals $S_A$ and can be connected, in a manner known per se, to sensors etc. (not shown) for this purpose.

The haptic control command input device 3 has at least one actuator 5 for operating the control command input device 3 in dependence on a correction signal $S_1$. Thus, a force, which displaces the control input element in accordance with the correction signal $S_1$ is introduced into the control input element used by the operator such as, for example, a joystick or a steering wheel. In this manner, the user is sensibly informed about the result of the arbitration.

Furthermore, at least one sensor 6 is provided in the haptic control command input device 3 in order to detect the manual control command input $S_M$. For this purpose, for example, the counterforce applied to the control input element by the user can be measured.

The automatically generated control signals $S_A$ and manual control command inputs $S_M$ are conducted to the arbitration unit 4 and are correlated with one another for the generation of the correction signals $S_1$, $S_2$ and of a controlled-system control signal $S_R$ which is applied to a subsequent controlled system 7. The subsequent controlled system 7 can be, for example, the automatic steering mechanism, automatic braking mechanism or the like of a motor vehicle.

The arbitration unit utilizes the dead space of the subsequent controlled system 7 as arbitration space for the arbitration. During the arbitration, an adjustment between the manual and automatic control wishes takes place which are correlated with one another suitably weighted (adjusted in rule-based manner) for generating the controlled-system control signal $S_R$.

As indicated by the dashed lines, states of the controlled system 7 can be optionally fed back to the automatic control command system 2 by means of the feedback signal $S_3$ or to the arbitration unit 4 by means of the feedback signal $S_4$. In this manner, a feedback control of the automatically generated control signals $S_A$ and of the correction signal $S_1$ and controlled-system control signal $S_R$, respectively, is implemented.

FIG. 2 shows the relationships between person, automation and environment as a diagram. It becomes clear that an arbitration, i.e. an adjustment of the automatic and manual control commands, takes place between the user input (person) and automatic control system (automation). The intentions of the person and of the automation are converted into a joint action which is conducted to the environment, i.e. the controlled system 7 in order to effect a control action.

To be able to generate the control signals manually by the person and automatically by the automation, the boundary conditions are perceived, for example by means of sensors or senses of the person.

In contrast to purely manually controlled technical devices such as, for example, vehicles, the assistance- or automation-supported technical devices to be controlled have an additional entity which perceives the environment in parallel with the person, forms intentions and thus again can act on the environment by means of action. Due to differences in the perception, for example, intentions of person and automation can be different. These conflicts are resolved by the formation of a common will, or arbitration.

An exemplary arbitration will be explained in the text which follows using the guidance of a vehicle as example. The fundamental task of starting to move or of stopping is described. Other, possibly more complex tasks can also be correspondingly solved.

In contrast to a traditional vehicle which is to be controlled by purely manual means, the vehicle, in the case of the control device 1, is equipped with an additional will which can act on the vehicle in parallel or even in opposition to the driver. This will is formed in the automatic control command system 2.

In an illustrative embodiment, the action space for the arbitration by the person and by the automation is discretized into five different states which can be easily transferred to other exemplary traffic situations:

stop request:
  red traffic light with hazard situation (for example pedestrians which are running across the street directly in front of the vehicle at the same time)
stop:
  red traffic light without hazard situation (for example intersection which is otherwise clear)
indeterminate:
  all states are acceptable (indifferent)
motion:
  starting without hazard situation (e.g. a vehicle is standing at a traffic light which switches to green)
motion request:
  starting with a hazardous situation (e.g. a vehicle is standing on a railway crossing which is approached by a train).

In order to resolve conflicts between such different states which are automatically and manually generated as control signals, the following sequence-dependent control concept is recommended:
1. The person can always prevail if one distinctly communicates a (safe and urgent) intended action (stop request or motion request in hazard situation (person demand) prevails);
2. The partner prevails who communicates a (safe and more urgent) intended action more clearly (stop request or motion request (demand) prevails);
3. The partner with the more conservative intended action prevails (stop prevails).

To resolve conflicts, it is also advantageous to provide a second arbitration phase which follows the first arbitration phase. This makes it possible to prevent the user from attempting with all might to prevail against the will of the automatic control command system 2. The user then has the opportunity first to stop when the automation stops, to reflect and only to prevail with an urgent control input where necessary (demand).

The secondary arbitration phase still provides the yielding entity, person or automation, with the possibility of changing the control signal generated in the arbitration phase by means of a manual intervention or indirectly by additional visual, acoustic or haptic communication. The communication can also be supplemented by voice input/output, noise input/output or visual indication. Thus, after the arbitration phase has elapsed, a prioritization can be effected, for example, by a different weighting of the manual and automatic control commands with the aid of discrete change-over switches or continuously switching elements (for example a potentiometer). Furthermore, there can be a coupling to states of the operator which are detected by recognizing the direction of his look or head or eyelid movement.

Using an optical, acoustic and/or haptic signal unit for outputting a communication signal dependent on the correction of the automatically generated control signal, it is possible to draw attention to the fact, for example by means of acoustic or visual outputs, that the automatic control command system 2 is proposing a different control action than has been agreed in the arbitration phase or secondary arbitration phase.

By means of suitable assessment of the automatic control signals $S_A$ and manual control command inputs $S_M$, the arbitration unit 4 can be used for adjusting vehicles to have different "temperaments". In the extreme case (especially for special cases) it is thus possible to have vehicles start to move distinctly more independently, or a safer and more urgent intended action of the automatic control command system 2 is distinctly more difficult to or can no longer be overridden by the user.

The deciding factor is that the primary arbitration phase of, for example, about two seconds, in which the automatic control command system 2 and the user can influence the haptic control command input device 3 in different ways, is used for the joint forming of wills. For this purpose, the actuator 5 of the haptic control command input device 3 is corrected by means of the correction signal $S_1$. The automatically generated control signal $S_A$ is corrected by feeding back the correction signal $S_2$ to the automatic control command system 2. For example, this makes it possible to signal that the automatic control command system 2 is holding back although it still wishes to start the vehicle, in that no forces or only reduced forces are exerted on the control command input device 3. During this "negotiation", the vehicle has not yet started to move since due to the parameterization of the haptic control command input device 3, the acceleration of the vehicle is only initiated at a position of the haptic control command input device 3 of a few degrees from a neutral position. Thus, a dead space predetermined by the dynamic vehicle and steering range is utilized as space for the arbitration.

FIG. 3 shows a second embodiment of the control device 1 which only differs from the first embodiment in the activation of the at least one actuator 5. The activation unit 4 is fed back to the automatic control system 2 in order to correct the automatically generated control signals $S_A$ in dependence on the correction signal $S_2$ at least within an arbitration phase. The at least one actuator is always activated in direct dependence on the automatically generated control signal $S_A$. The detected manual control command inputs $S_M$ in this arrangement are the response of the operator to the actuatory adjustment of the control command input device 3 by the automatically generated control signals $S_A$. Since, for the correction of the automatically generated control signals $S_A$, the correction signal $S_2$ is transferred to the automatic control system 2 from the arbitration unit and, as a result, an adaptation of the activity of the at least one actuator 5 takes place. That is, a balancing of the control actions takes place between operator and automatic control command system 2 at the haptic control command input device 3.

FIG. 4 shows a third embodiment of the control device 1. It differs from the second embodiment in that a first group of actuators 5a, which are directly activated with a signal correlated with the automatically generated control signal $S_A$ via the automatic control command system 2 is provided in the haptic control command input device 3. Furthermore, a second group of actuators 5b is provided which are activated in dependence on the correction signal $S_1$. The feedback of the correction signal $S_2$ to the automatic control command system 2 is optional.

In this embodiment, the effect of the automatically generated control signal $S_A$ is mechanically corrected by the correction signal $S_1$ in that the first and second group of actuators 5a, 5b operate together or against one another depending on arbitration.

The invention claimed is:

1. Control device (1) comprising:
an automatic control command system (2) for the automatic generation of control signals ($S_A$),
a haptic control command input device (3) which has at least one actuator (5) for operating the control command input device (3) in dependence on the automatically generated control signals ($S_A$) and at least one sensor (6) for detecting manual control command inputs ($S_M$) by manual operation of the control command input device (3),
an arbitration unit (4) for generating controlled system control signals ($S_R$) which are conducted to a controlled system (7) following the arbitration unit (4), in dependence on the automatically generated control signals ($S_A$) and the manual control command inputs ($S_M$),
characterized in that
the arbitration unit (4) is set up, in order, in the case of mutually contradictory or overriding manual control command inputs ($S_M$) and automatically generated control signals ($S_A$), and within an arbitration phase selected in dependence on a dead space of the haptic control command input device (3) or the controlled system (7), to continuously adjust the manual control command inputs ($S_M$) and the automatically generated control signals ($S_A$) to one another, by rule-based generation of one or more correction signals ($S_1$, $S_2$) and feeding back the one or more correction signals ($S_1$, $S_2$) to at least one actuator (5) of the haptic control command input device (3).

2. Control device (1) according to claim 1, characterized in that the arbitration unit (4) is connected to said at least one actuator (5) of the haptic control command input device (3) for activating the at least one actuator (5) in dependence on the one or more correction signals ($S_1$, $S_2$).

3. Control device (1) according to claim 1, characterized in that the arbitration unit (4) is connected to the automatic control command system (2) for feeding back at least one of the one or more correction signals ($S_1$, $S_2$) to the automatically generated control signal ($S_A$) and said at least one actuator (5) of the haptic control command input device (3) is activated in dependence on the automatically generated control signal ($S_A$).

4. Control device (1) according to claim 1, characterized in that the haptic control command input device (3) has a first group of actuators (5a) which are activated in dependence on the automatically generated control signals ($S_A$) of the automatic control system, and a second group of actuators (5b) which are activated in dependence on at least one of the one or more correction signals ($S_1$, $S_2$) of the arbitration unit (4).

5. Control device (1) according to claim 1, characterized in that the control device (1) is set up for a variable adjustment of the dead space of the controlled system (7).

6. Control device (1) according to claim 1, characterized in that the arbitration unit (4) is set up for evaluating the safety and urgency of intended actions in each case predetermined by the automatically generated control signals ($S_A$) and manual control command inputs ($S_M$) and for prioritizing whichever ($S_A$, $S_M$) produces a safer or more urgent control action.

7. Control device (1) according to claim 6, characterized in that for prioritization, the automatically generated control signals ($S_A$) are amplified when control actions to be effected by the automatically generated control signals ($S_A$) are preassessed as safer or more urgent than the control actions to be effected by the manual control command inputs ($S_M$), and the automatically generated control signals ($S_A$) are reduced when control actions to be effected by the manual control command inputs ($S_M$) are preassessed as safer or more urgent than the control actions to be effected by the automatically generated control command inputs ($S_A$).

8. Control device (1) according to claim 6, characterized in that, for prioritization, the automatically generated control signals ($S_A$) are reduced when control actions to be effected by the automatically generated control signals ($S_A$) and the control actions to be effected by the manual control command inputs ($S_M$) are preassessed as safe and urgent.

9. Control device (1) according to claim 1, characterized in that the control device (1) has a discrete change-over switch connected to the arbitration unit (4) or a continuous switching element for prioritizing the manual control command input ($S_M$).

10. Control device (1) according to claim 1, characterized in that the control device (1) has at least one signal unit, coupled to the arbitration unit (4), for at least one of optical, acoustic and haptic output of a communication signal dependent on a correction of the automatically generated control signals ($S_A$).

11. Control device (1) according to claim 1, characterized in that the control device (1) has at least one input unit, coupled to the arbitration unit (4), for at least one of optical, acoustic and haptic input of communication signals or states for correcting the controlled-system control signals ($S_R$).

12. Control device (1) according to claim 1, characterized in that the control device (1) is set up for detecting discrete command inputs for manual control command inputs ($S_M$) and generating additional control signals.

13. Control device (1) according to claim 12, characterized in that the arbitration unit (4) is set up for not forwarding the additional control signals to the controlled system (7) following the arbitration unit (4).

14. Control device (1) according to claim 12, characterized in that the control device (1) has a plurality of state machines or pattern recognizers, wherein said state machines or pattern recognizers being activatable in dependence on detected signal patterns from manual control command inputs ($S_M$) and coupled to one another for mutual activation for outputting defined control signals.

15. Control device (1) according to claim 1, characterized in that the automatic control command system (2) is set up for generating neutral control signals not acting on the controlled system (7) and the arbitration unit (4) is set up for detecting the response by manual control command inputs ($S_M$) to the neutral control signals and generating control signals ($S_R$) for the subsequent controlled system (7) in dependence on the detected response.

16. Method for generating control signals for technical devices which have at least one controlled system and a control device (1) comprising:
an automatic control command system (2) for the automatic generation of control signals ($S_A$),
a haptic control command input device (3) which has at least one actuator (5) for operating the control command input device (3) in dependence on the automatically generated control signals ($S_A$) and at least one sensor (6) for detecting manual control command inputs ($S_M$) by manual operation of the control command input device (3),
an arbitration unit (4) for generating control signals ($S_R$) which are conducted to a controlled system (7) following the arbitration unit (4), in dependence on the automatically generated control signals ($S_A$) and the manual control command inputs ($S_M$),
characterized in that
the arbitration unit (4) is set up in order, in the case of mutually contradictory or overriding manual control command inputs ($S_M$) and automatically generated control signals ($S_A$), to continuously adjust to one another, within an arbitration phase selected in dependence on a dead space of the haptic control command input device (3) or the controlled system (7), the manual control command inputs ($S_M$) and the automatically generated control signals ($S_A$), by rule-based generation of one or more correction signals ($S_1$, $S_2$) and feeding back the one or more correction signals ($S_1$, $S_2$) to at least one actuator (5) of the haptic control command input device (3), characterized by the following steps:
automatic generation of control signals ($S_A$) and actuatory operation of a control command input device (3) in dependence on the automatically generated control signals ($S_A$),
detection of manual control command inputs ($S_M$) via the control command input device (3) as response to the actuatory operation of the control command input device (3) by the automatically generated control signals ($S_A$),
generation of controlled-system control signals ($S_R$) for the controlled system (7) by the arbitration unit (4) comprising, in the case of mutually contradictory or overriding manual control command inputs ($S_M$) and automatically generated control signals ($S_A$),
continuous adjustment of the manual control command inputs ($S_M$) and of the automatically generated control signals ($S_A$) to one another by rule-based generation of the one or more correction signals ($S_1$, $S_2$), and feedback of the one or more correction signals correction signal ($S_1$, $S_2$) to at least one actuator (5) of the haptic control command input device (3) within an arbitration phase selected in dependence on a dead space of the haptic control command input device (3) or the controlled system (7).

17. Method according to claim 16, characterized by feeding back the one or more correction signals ($S_1$, $S_2$) to the haptic control command input device (3) for activating the at least one actuator (5).

18. Method according to claim 16, characterized by feeding back the one or more correction signals ($S_1$, $S_2$) to the automatic control command system (2) for correcting the automatically generated control signal ($S_A$) and activating the at least one actuator (5) of the haptic control command input device (3) in dependence on the automatically generated control signal ($S_A$).

19. Method according to claim 16, characterized by activating a first group of actuators (5a) in dependence on the automatically generated control signals ($S_A$) of the automatic control system (2) and activating a second group of actuators (5b) in dependence on the correction signals ($S_1$, $S_2$) of the arbitration unit (4).

20. Method according to claim 16, characterized by variable adjustment of the dead space of the controlled system (7).

21. Method according to claim 16, characterized by evaluation of safety and urgency of intended actions in each case predetermined by the automatically generated control signals ($S_A$) and manual control command inputs ($S_M$) and prioritization of whichever ($S_A$, $S_M$) produces a safer and more urgent control action.

22. Method according to claim 16, characterized by amplification of the automatically generated control signals ($S_A$) for prioritization when the control actions to be effected by the automatically generated control signals ($S_A$) are preassessed as safer or more urgent than the control actions to be effected by the manual control command inputs ($S_M$), and reducing the effect of the automatically generated control signals ($S_A$) when the control actions to be effected by the manual control command inputs ($S_M$) are preassessed as safer or more urgent than the control actions to be effected by the automatically generated control signals ($S_M$).

23. Method according to claim 16, characterized by reducing the automatically generated control signals ($S_A$) for prioritization, when both the control actions to be effected by the automatically generated control signals ($S_A$) and the control actions to be effected by the manual control command inputs ($S_M$) are preassessed as safe or urgent.

24. Method according to claim 16, characterized by discrete switch-over or continuous transition for prioritization of the manual control command input ($S_M$) or automatically generated control signals ($S_A$) after the arbitration phase has been completed, and generation of the controlled-system control signals ($S_R$) in dependence on weighted manual control command inputs ($S_M$) and weighted automatically generated control signals ($S_A$).

25. Method according to claim 16, characterized by the recognition of discrete command inputs from manual control command inputs ($S_M$) and generation of additional control signals which are not forwarded to the controlled system (7) following the arbitration unit (4).

26. Method according to claim 16, characterized by the detection of discrete control signals by recognizing individual signal patterns from the manual control command inputs ($S_M$) and activation of state machines or pattern recognizers in dependence on signal patterns which are in each case predetermined.

27. Method according to claim 16, characterized by the generation of neutral control signals not acting on the controlled system (7) and detection of the response by manual control command inputs ($S_M$) to the automatically generated neutral control signals and generation of controlled-system control signals ($S_R$) for the controlled system (7) following the arbitration unit (4) in dependence on the detected response.

* * * * *